US010783544B1

(12) United States Patent
Stringfellow

(10) Patent No.: US 10,783,544 B1
(45) Date of Patent: Sep. 22, 2020

(54) SECURE LOYALTY PROGRAMS

(71) Applicant: Target Brands, Inc., Minneapolis, MN (US)

(72) Inventor: Westley M. Stringfellow, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 662 days.

(21) Appl. No.: 15/384,902

(22) Filed: Dec. 20, 2016

Related U.S. Application Data

(60) Provisional application No. 62/270,535, filed on Dec. 21, 2015.

(51) Int. Cl.
| | |
|---|---|
| *G06Q 30/00* | (2012.01) |
| *G06Q 30/02* | (2012.01) |
| *G06Q 20/40* | (2012.01) |
| *G06Q 20/38* | (2012.01) |
| *G06F 16/13* | (2019.01) |
| *G06Q 50/20* | (2012.01) |

(52) U.S. Cl.
CPC ......... *G06Q 30/0226* (2013.01); *G06F 16/13* (2019.01); *G06Q 20/3829* (2013.01); *G06Q 20/409* (2013.01); *G06Q 30/0215* (2013.01); *G06Q 50/20* (2013.01); *G06Q 2220/00* (2013.01)

(58) Field of Classification Search
CPC ...................... G06Q 30/0215; G06Q 30/0226
USPC ......................................................... 705/14
See application file for complete search history.

(56) References Cited

U.S. PATENT DOCUMENTS

| | | | | |
|---|---|---|---|---|
| 6,978,250 B1 * | 12/2005 | Kawan | ............... | G06Q 20/02 |
| | | | | 705/14.36 |
| 2002/0099601 A1 * | 7/2002 | Farrell | ............... | G06Q 30/02 |
| | | | | 705/14.32 |
| 2002/0161630 A1 * | 10/2002 | Kern | ............... | G06Q 30/02 |
| | | | | 705/14.32 |
| 2003/0009382 A1 * | 1/2003 | D'Arbeloff | ............ | G06Q 20/02 |
| | | | | 705/17 |
| 2004/0073480 A1 * | 4/2004 | Nahmias | ............... | G06Q 20/10 |
| | | | | 705/14.35 |

(Continued)

OTHER PUBLICATIONS

Arnold, Allen George, Alternative Funding Strategies and Resources for the Development of Undergraduate Insurance and Risk Management Programs: Exploring the Efficacy of a Theoretical Model, 2014, ProQuest Dissertations Publication (Year: 2014).*

(Continued)

*Primary Examiner* — Matthew L Hamilton
(74) *Attorney, Agent, or Firm* — Fish & Richardson P.C.

(57) ABSTRACT

In one implementation, a system with a decentralized architecture to provide secure loyalty program includes a plurality of separate database systems to disperse storage of data for the secure loyalty program across a plurality of separate file systems with different authentication and encryption schemes, a loyalty program computer system to securely allocate loyalty rewards in real-time, a first intermediary computer system to securely manage and provide access to the first intermediary database system, and a second intermediary computer system to securely manage and provide access to the second intermediary database system.

18 Claims, 9 Drawing Sheets

(56) References Cited

U.S. PATENT DOCUMENTS

| | | | | |
|---|---|---|---|---|
| 2005/0133590 | A1* | 6/2005 | Rettenmyer | G06K 19/08 235/380 |
| 2006/0190323 | A1* | 8/2006 | Olson | G06Q 30/02 705/14.27 |
| 2006/0253321 | A1* | 11/2006 | Heywood | G06Q 30/02 705/14.18 |
| 2007/0198352 | A1* | 8/2007 | Kannegiesser | G06Q 20/06 705/14.17 |
| 2008/0103910 | A1* | 5/2008 | Gardenswartz | G06Q 10/04 705/14.25 |
| 2008/0162258 | A1* | 7/2008 | Kala | G06Q 30/02 705/7.33 |
| 2010/0042517 | A1* | 2/2010 | Paintin | G06Q 30/02 705/30 |
| 2011/0264905 | A1* | 10/2011 | Ovsiannikov | H04L 29/08792 713/151 |
| 2013/0007849 | A1* | 1/2013 | Coulter | G06F 21/10 726/4 |
| 2013/0238408 | A1* | 9/2013 | Cooke | G06Q 30/0207 705/14.3 |
| 2017/0161743 | A1* | 6/2017 | Binder | G06Q 20/382 |
| 2020/0082485 | A1* | 3/2020 | Hinshaw | G06Q 20/355 |

OTHER PUBLICATIONS blogs.wsj.com' [online] Farrell .M., "Lending Club's Newest Deal Fuels Investor Excitement," Feb. 10, 2015, [retrieved on Mar. 30, 2018], retrieved from: URL<https://blogs.wsj.com/moneybeat/2015/02/10/lending-clubs-new-deals-fuel-investor-excitement/>, 2 pages.

bloomberg.com' [online] Shenn and Campbell., "SoFi CEO Sees $4 Billion of Loans as Startup Seeks Mortgages," Mar. 10, 2015, [retrieved on Mar. 30, 2018], retrieved from: URL<https://www.bloomberg.com/news/articles/2015-03-11/sofi-ceo-sees-4-billion-of-loans-as-startup-targets-mortgages>, 5 pages.

bloomberg.com' [online] Weiss .M.,"Harvard Graduates Targeted by Alumni-Backed Loan Funds," Dec. 11, 2012, [retrieved on Mar. 30, 2018], retrieved from: URL<https://www.bloomberg.com/news/articles/2012-12-12/harvard-graduates-targeted-by-alumni-backed-loan-funds>, 5 pages.

businesswire.com' [online] "Upromise by Sallie Mae MasterCard Program Tops $50 Million in Savings for College in 2014," Apr. 7, 2015, [retrieved on Mar. 29, 2018], retrieved from: URL<https://www.businesswire.com/news/home/20150407006410/en/Upromise-Sallie-Mae-MasterCard-Program-Tops-50#.VbmLSM7bBUR>, 4 pages.

earnest.com' [online] "Year 1 of 100: Building the bank of the future," Available on or before Oct. 6, 2017 [retrieved on Mar. 29, 2018], retrieved from: URL<https://www.earnest.com/blog/year-1-of-100-building-the-bank-of-the-future/>, 9 pages.

forbes.com' [online] Shin .L., "Lending Startup Earnest Jumps Into the Student Loan Refinancing Game," Jan. 27, 2015, [retrieved on Mar. 30, 2018], retrieved from: URL<https://www.forbes.com/sites/laurashin/2015/01/27/lending-startup-earnest-jumps-into-the-student-loan-refinancing-game/#4516d4a11eba>, 4 pages.

frugaltravelguy.com' [online] Ingersoll .R., "Playing the Reselling Game: Upromise Shopping Mall," Apr. 2, 2014, [retrieved on Mar. 29, 2018], retrieved from: URL<https://www.frugaltravelguy.com/2014/04/reselling-upromise-shopping-mall.html>, 4 pages.

lendingclub.com' [online] "Create your account," [retrieved on Mar. 30, 2018], retrieved from: URL<https://www.lendingclub.com/lenderg/createaccount>, 2 pages.

lendingclub.com' [online] "How does an online credit marketplace work?" Available on or before Aug. 16, 2011, via Internet Archive: Wayback Machine URL<https://web.archive.org/web/20110816003416/https://www.lendingclub.com/public/how-peer-lending-works.action>, [retrieved on Mar. 29, 2018], retrieved from: URL<https://www.lendingclub.com/public/how-peer-lending-works.action>, 4 pages.

nerdwallet.com' [online] Jayakumar and Lee., "Upstart Personal Loans: 2018 Review," Jan. 2, 2018 [retrieved on Mar. 29, 2018], retrieved from: URL<https://www.nerdwallet.com/blog/loans/upstart-review-personal-loans-beginners/>, 12 pages.

nerdwallet.com' [online] Jayakumar. A., "LendingClub Personal Loans: 2018 Review," Mar. 8, 2018, [retrieved on Mar. 30, 2018], retrieved from: URL<https://www.nerdwallet.com/blog/loans/lending-club-personal-loan-review/>, 13 pages.

nerdwallet.com' [online] Ong. M., "Upromise.com and Back to School Savings," Available on or before Mar. 8, 2013, via Internet Archive: Wayback Machine URL<https://web.archive.org/web/20130308073904/https://www.nerdwallet.com/blog/shopping/rewards-malls/upromise-review/>, [retrieved on Mar. 29, 2018], retrieved from: URL<https://www.nerdwallet.com/blog/shopping/rewards-malls/upromise-review/>, 5 pages.

prnewswire.com' [online] "CommonBond Announces Innovative Financing Partnership With Nelnet," Feb. 5, 2015, [retrieved on Mar. 29, 2018], retrieved from: URL<https://www.prnewswire.com/news-releases/commonbond-announces-innovative-financing-partnership-with-nelnet-300031483.html>, 4 pages.

seekingalpha.com' [online] "Lending Club: Data Indicates 2Q Revenue In-Line or Above Management Guidance," Jul. 31, 2015, [retrieved on Mar. 29, 2018], retrieved from: URL<https://seekingalpha.com/article/3383385-lending-club-data-indicates-2q-revenue-in-line-or-above-management-guidance>, 2 pages.

sofi.com' [online] "Frequently Asked Questions," Available on or before Sep. 23, 2013, via Internet Archive: Wayback Machine URL<https://web.archive.org/web/20130923140838/https://www.sofi.com/faq/>, [retrieved on Mar. 30, 2018], retrieved from: URL<https://www.sofi.com/faq/>, 4 pages.

techcrunch.com' [online] Shieber .J., "New Loan Refinancing Tool and $17M Round Shows the Importance of Earnest," Jan. 27, 2015, [retrieved on Mar. 30, 2018], retrieved from: URL<https://techcrunch.com/2015/01/27/new-loan-refinancing-tool-and-17m-round-shows-the-importance-of-earnest/>, 9 pages.

upromise.com' [online] "How upromise can help you," Available on or before Mar. 26, 2015, via Internet Archive: Wayback Machine URL<https://web.archive.org/web/20150326023527/https://www.upromise.com/learn/how-it-works/>, [retrieved on Mar. 29, 2018], retrieved from: URL<https://www.upromise.com/learn/how-it-works/>, 2 pages.

* cited by examiner

SECURE LOYALTY PROGRAMS

CROSS-REFERENCE TO RELATED APPLICATIONS

This application claims the benefit of U.S. Provisional Application Ser. No. 62/270,535, filed Dec. 21, 2015.

TECHNICAL FIELD

This document generally describes technology related to secure computer-implemented loyalty programs.

BACKGROUND

A variety of different flavors of consumer loyalty programs have been implemented by merchants, credit card providers, and others who are involved in consumer spending. For example, merchants have provided loyalty programs and consumers can register loyalty accounts with these programs (often at no fee to the customer). When a user makes a purchase with a retailer with whom the user has a loyalty account, the user can provide information identifying his/her loyalty account and a loyalty reward for the purchase can be added to the user's account. Loyalty rewards can take a variety of different forms, including points, miles, and money, and can be determined based on a variety of factors, such as an amount being purchased, whether the items being purchased are on sale or otherwise discounted, and/or a type of item that is being purchased. For example, retailers may try to incentivize particular types of purchases at various times throughout the year by increasing and/or decreasing the loyalty reward that is awarded for those types of purchases. Loyalty accounts may be associated with credit card accounts and/or other types of accounts, which can cause loyalty rewards to be accrued when the credit card/other types of accounts are used.

Users have been able to redeem their loyalty rewards in a variety of different ways. For example, users have been able to trade in loyalty rewards for cash rebates, in-store credits/purchases, goods/services, discounts, charitable donations, travel, and other types of rewards.

Loyalty programs have been designed to incentivize users into purchasing particular types of goods/services and/or into making purchases with particular merchants or companies. For example, the more often a user visits a retailer with a loyalty program, the more loyalty rewards the user can accumulate and ultimately redeem.

SUMMARY

This document generally describes technology for improving the security around consumer loyalty programs and for establishing additional, secure channels for both obtaining and using loyalty rewards. Online account security has been a pervasive issue in recent years, with a seemingly endless stream of data breaches occurring across a variety of different sectors and industries. Consumer loyalty programs can be vulnerable to attack because they are associated with a variety of sensitive information, such as information that identifies a user (e.g., name, birthday, social security number) and that identifies accounts associated with the user (e.g., bank accounts, credit card accounts). This document describes a variety of techniques for improving security around consumer loyalty programs, which can allow for consumer loyalty programs to be applied in a variety of different contexts that may have previously posed a security risk to both the entities providing the program and to consumers.

For example, loyalty programs can be extended to securely include student loan and education rewards. Student loan debt and education costs have risen sharply in recent years and a large proportion of the US population have some form of student loan debt. Loyalty programs can be configured to provide secure ways to store, manage, and communicate loyalty/reward information to various entities (e.g., banks, loan providers, financial institutions, retailers, loyalty program managers, and/or others) to provide rewards in the form of student loan and/or education assistance. Rewards can be provided in any of a variety of ways, such as (a) a college savings account (e.g., 529 plan) that accumulates loyalty rewards (money) and, in some instances, interests over time that can then be redeemed to pay for qualifying educational expenses at a later date (e.g., when beneficiary of loyalty account attends college); (b) loyalty rewards (money) can be applied to existing student loan debts on an ongoing basis (e.g., loyalty rewards can accumulate and at the end of each month the accumulated rewards can be applied to the student loan balance); (c) loyalty rewards can be used to assist users in refinancing their existing student loans; (d) loyalty rewards can be used to provide users with interest-free student loans (e.g., loyalty rewards (money) can be accumulated before college and the accumulated rewards can be used to cover the interest portion on student loans (during and/or after school) that a user takes out so as to provide a zero-percent student); and (e) combinations thereof.

In one implementation, a computer-implemented method includes receiving, at a computer system, a request to register for a user for a consumer loyalty program that provides student loan repayment rewards; associating, by the computer system, a loyalty account for the user with a student loan account for the user; identifying, by the computer system, (i) purchases made in association with the loyalty account for the user and (ii) an amount of money spent on the purchases; allocating, by the computer system, a portion of the amount of money for contribution to the student loan account for the user; and causing, by the computer system, the portion of the amount of money to be applied to the student loan account.

In another implementation, a computer-implemented method includes receiving, at a computer system, a request to register for a user for a consumer loyalty program that provides education financing rewards; associating, by the computer system, a loyalty account for the user with a education savings account for the user; identifying, by the computer system, (i) purchases made in association with the loyalty account for the user and (ii) an amount of money spent on the purchases; allocating, by the computer system, a portion of the amount of money for contribution to the education savings account for the user; and causing, by the computer system, the portion of the amount of money to be applied to the education savings account.

Such a computer-implemented method can optionally include one or more of the following features. The computer-implemented can further include receiving an indication that the user has enrolled in a qualifying education program; and causing, by the computer system, resources from the education savings account for the user to be applied toward tuition or other qualifying expenses for the education program.

In another implementation, a computer-implemented method includes receiving, at a computer system, a request to register for a user for a consumer loyalty program that provides student loan refinancing rewards; associating, by the computer system, a loyalty account for the user with a student loan account for the user; identifying, by the computer system, purchases made in association with the loyalty account for the user; determining, by the computer system, that the user qualifies for refinancing of the student loan account through the customer loyalty program based, at least in part, on the purchases in association with the loyalty account; and causing, by the computer system, the student loan account to be refinanced.

In another implementation, a computer-implemented method includes receiving, at a computer system, a request to register for a user for a consumer loyalty program that provides education financing rewards; associating, by the computer system, a loyalty account for the user with an education savings account for the user; identifying, by the computer system, (i) purchases made in association with the loyalty account for the user and (ii) an amount of money spent on the purchases; allocating, by the computer system, a portion of the amount of money for contribution to the education savings account for the user; causing, by the computer system, the portion of the amount of money to be applied to the education savings account before the user has enrolled in any of a plurality of qualifying education programs; receiving, at the computer system, an indication that the user has enrolled in an education program from the plurality of qualifying education programs; and causing, by the computer system, the user to receive a no-interest student loan for the education program based on the education savings account.

Such a computer-implemented method can optionally include one or more of the following features. A no-interest period for the student loan can include a period of time while the user is enrolled in the education program. The no-interest period for the student loan can additionally include a later period of time after the user has completed or is otherwise no longer enrolled in the education program. A no-interest period for the student loan can include a period of time after the user has completed or is otherwise no longer enrolled in the education program.

In another implementation, a computer-implemented method includes receiving, at a computer system, instructions to apply an amount of money to a student loan account, wherein the amount of money is received as a distribution from a customer loyalty program and the determination of the amount of money is based on: (i) a request to register a user for the consumer loyalty program that provides student loan repayment rewards, (ii) a loyalty account for the user being associated with the student loan account for the user, (iii) purchases being made in association with the loyalty account for the user and an amount of money spent on the purchases being identified, and (iv) a portion of the amount of money being allocated for contribution to the student loan account for the user; and distributing, by the computer system, the amount of money to the student loan account.

In another implementation, a computer-implemented method includes receiving, at a computer system, instructions to apply an amount of money to an education savings account, wherein the amount of money is received as a distribution from a customer loyalty program and the determination of the amount of money is based on: (i) a request to register a user for the consumer loyalty program that provides education financing rewards, (ii) a loyalty account for the user being associated with the education savings account for the user, (iii) purchases being made in association with the loyalty account for the user and an amount of money spent on the purchases being identified, and (iv) a portion of the amount of money being allocated for contribution to the education savings account for the user; and distributing, by the computer system, the amount of money to the education savings account.

Such a computer-implemented method can optionally include one or more of the following features. The computer-implemented method can further include receiving, at the computer system, instructions to distribute resources from the education savings account toward tuition or other qualifying expenses of an education program, wherein the instruction to distribute the resources are received in response to the user enrolling in a qualifying education program.

In another implementation, a computer-implemented method includes receiving, at a computer system, instructions to apply an amount of money to an education savings account, wherein the amount of money is received as a distribution from a customer loyalty program and the determination of the amount of money is based on: (i) a request to register a user for the consumer loyalty program that provides education financing rewards, (ii) a loyalty account for the user being associated with the education savings account for the user, (iii) purchases being made in association with the loyalty account for the user and an amount of money spent on the purchases being identified, and (iv) a portion of the amount of money being allocated for contribution to the education savings account for the user; distributing, by the computer system, the amount of money to the education savings account; receiving, at the computer system, instructions to distribute resources from the education savings account toward interest on a student loan so as to cover all recurring interest payments and to provide the user with a no-interest student loan; and distributing, by the computer system, the resources from the education savings account toward the interest payments for the student loan.

In another implementation, a computer system includes means for receiving a request to register for a user for a consumer loyalty program that provides student loan repayment rewards; means for associating a loyalty account for the user with a student loan account for the user; means for identifying (i) purchases made in association with the loyalty account for the user and (ii) an amount of money spent on the purchases; means for allocating a portion of the amount of money for contribution to the student loan account for the user; and means for causing the portion of the amount of money to be applied to the student loan account.

Certain implementations may provide one or more advantages. For example, the security around loyalty programs can be improved, which can reduce the possibility of data breaches and can increase the extension of loyalty programs to additional situations. For instance, loyalty programs can be extended to include student loan and education rewards, which can be beneficial to a large number of people who are either currently in debt or are facing significant future educational loans.

The loyalty rewards (cash) from multiple loyalty accounts (i.e. multiple customers) can be paid to a single account (529, college loan or savings account as prepayment for loan interest). Likewise, retailers and merchants from any sector can participate in the loyalty program; thereby allowing a network of customers (family members, supporting institutions, etc. . . . ) to contribute their loyalty rewards to the benefit of a single or multiple students.

The details of one or more embodiments are set forth in the accompanying drawings and the description below.

Other features and advantages will be apparent from the description and drawings, and from the claims.

DESCRIPTION OF DRAWINGS

Like reference symbols in the various drawings indicate like elements.

DETAILED DESCRIPTION

Figure 1A:
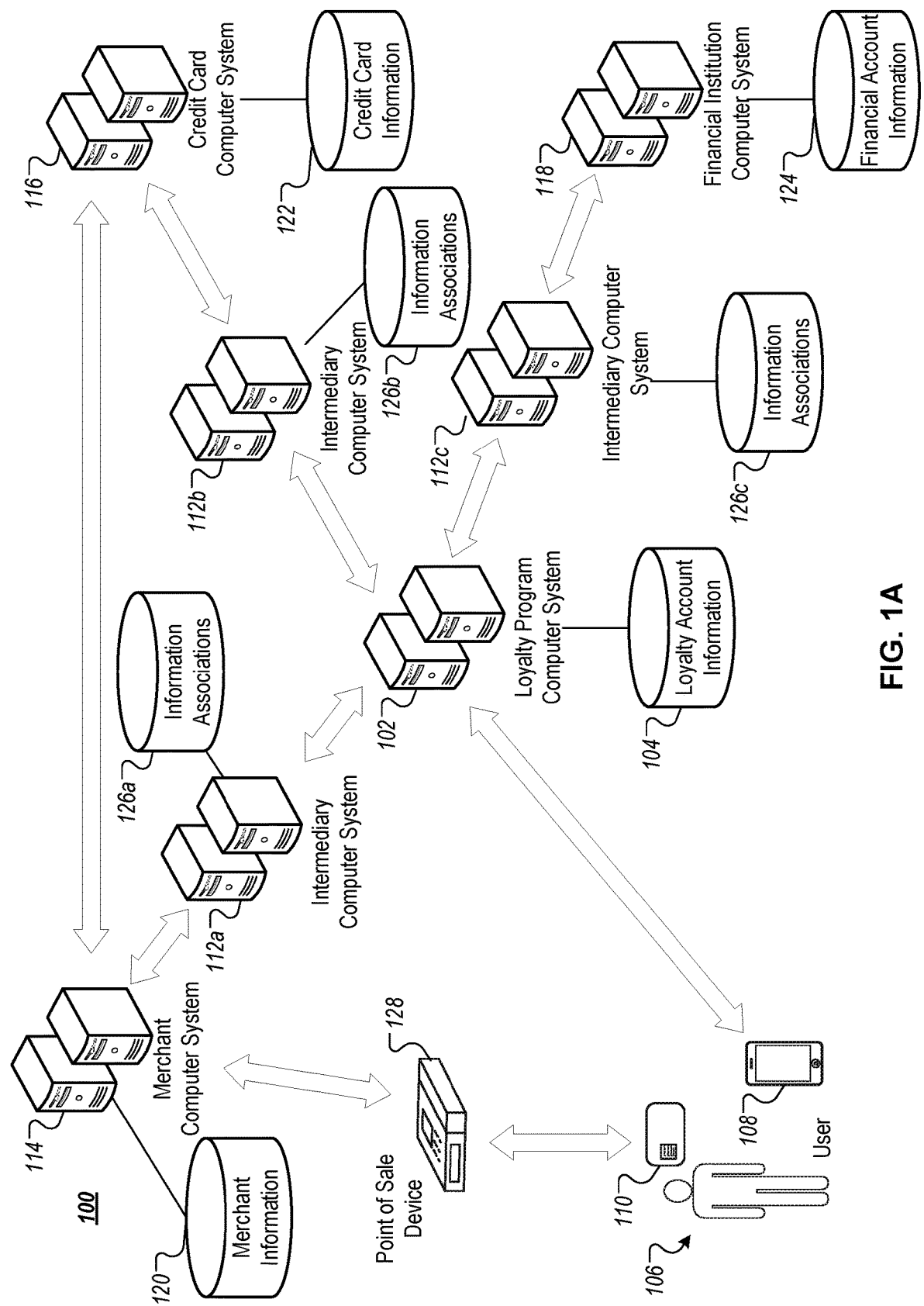
FIGS. 1A-B depicts an example system for providing a secure customer loyalty program.
Figure 1B:
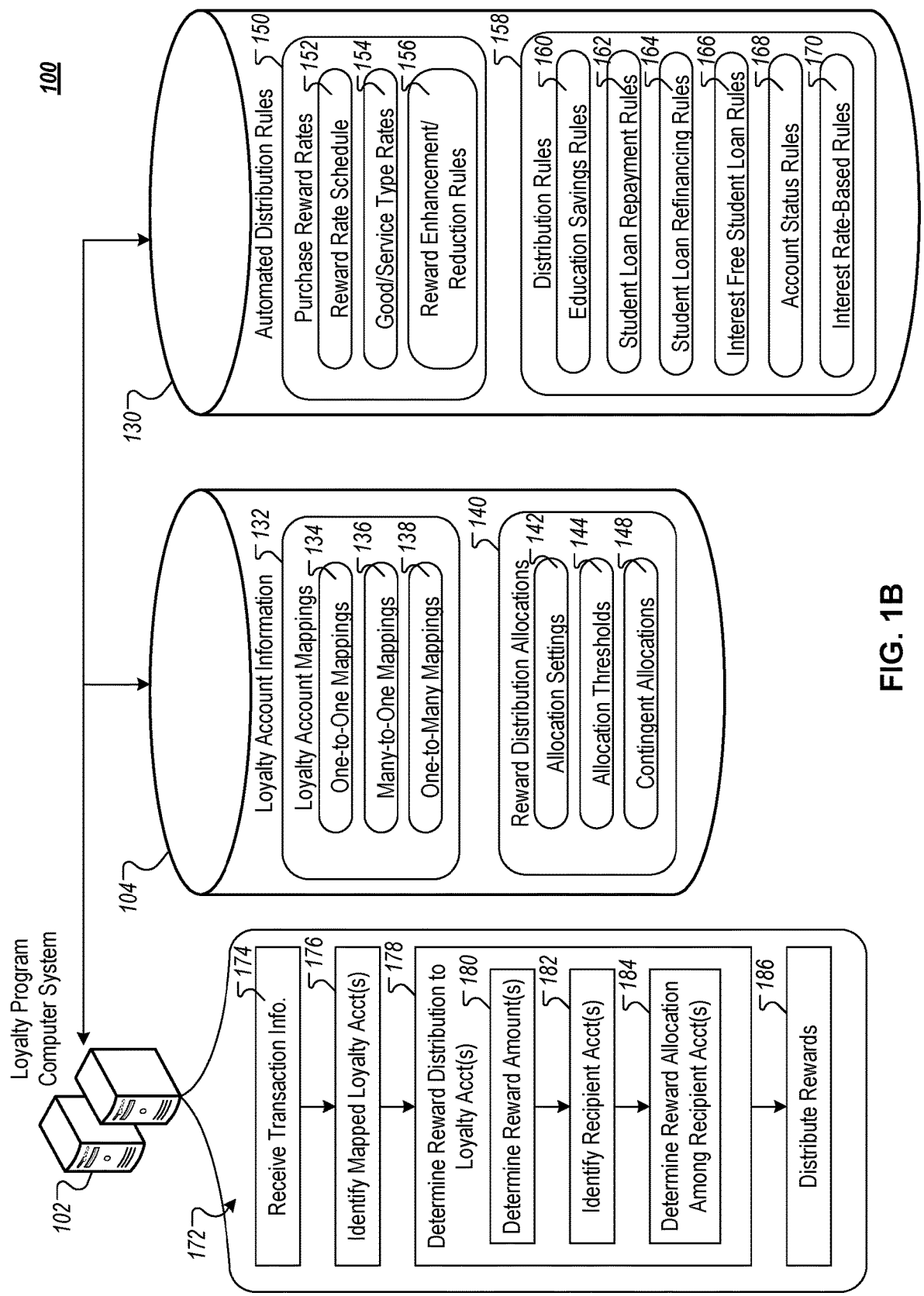

FIGS. 1A-B depicts an example system 100 for providing a secure customer loyalty program. The example system 100 includes a loyalty program computer system 102 that is programmed to manage one or more consumer loyalty programs through which consumers can earn and redeem loyalty rewards. The loyalty program computer system 102 can include a data repository 104 (e.g., database) that includes loyalty account information (e.g., user information, account numbers, type of loyalty program enrolled in, reward balance, reward history, redemption history, qualifying transactions) and other information related to administration/management of the loyalty programs (e.g., loyalty reward rates, rules, and schedules).

A user 106 can register with the loyalty program computer system 102 using, for example, a personal computing device 108 (e.g., smartphone, tablet, smartwatch, laptop, desktop computer) or a paper submission, or over the phone with an agent, or in the store with a kiosk. The user 106 can communicate with the loyalty program computer system 102 using the device 108 over one or more appropriate communication networks, such as the internet, mobile data networks (e.g., 4G LTE networks), local area networks (LANs), wide area networks (WANs), virtual private networks (VPNs), wireless networks (e.g., Wi-Fi, BLUETOOTH), or any combination thereof. The communication can utilize one or more appropriate communication protocols, such as TCP/IP, IEEE 802.11, LTE, and/or other protocols. Registration can involve the computing device 108 transmitting appropriately formatted information to the loyalty program computer system 102, such as the name of user 106, address, date of birth, social security number, desired loyalty program, and other appropriate details. Such information can be transmitted using one or more secure communication channels, such as through end-to-end encrypted communication between the computing device 108 and the computer system 102. Any of a variety of appropriate encryption schemes can be used for the communication, such as public key encryption (e.g., RSA), transport layer security (e.g., HTTPS), and/or other appropriate techniques. The loyalty program computer system 102 can receive the information, evaluate/validate the information (e.g., run a credit check on the user, verify the user's address and date of birth), and enroll the user 106 in the program when appropriate.

The loyalty program computer system 102 can store some sensitive information about the user 106 in the data repository 104 as part of the enrollment process, such as date of birth, address, contact information, and/or other sensitive information for the user 106. This information can be stored in single locations (dedicated storage location for the information) or in multiple locations (cloud-based storage system). Any of a variety of appropriate security mechanisms can be used to ensure that the user information is securely stored in the repository 104, such as encrypting the information and subsequently storing the encrypted information, splitting the data into portions and storing the portions at different storage locations/addresses so that the information is not stored in contiguous and readily usable blocks of information, and/or other appropriate data storage techniques to securely store the information.

As part of the enrollment process, the user 106 can link various other accounts with the user's loyalty program account. For example, the user 106 can link a credit card account (associated with the user's credit or debit card 110—reference to credit cards in this document can include credit cards and/or debit cards) to his/her loyalty account so that when the user 106 makes a qualifying purchase (e.g., purchase with particular retailer, type or brand of good/service purchased, item at full price), the user's loyalty account can be credited with corresponding rewards. In another example, the user 106 can link one or more financial accounts to his/her loyalty account, such as bank accounts, investment accounts, mortgage accounts, loan accounts, retirement accounts, and/or other appropriate financial accounts. Other types of accounts can also be linked to the user's loyalty account, such as social media/network accounts, accounts held by other users authorizing the linkage (e.g., family members, friends, colleagues), and/or other appropriate accounts.

When linking accounts, the loyalty program computer system 102 can use one or more intermediary computer systems 112a-c that can securely connect to and authenticate user accounts with various other computer systems, such as a merchant computer system 114 (associated with one or more merchants), a credit card computer system 116 (associated with one or more credit card providers), and financial institution computer systems 118 (associated with one or more financial institutions). Each of these systems 114-118 can use particular communication and security protocols, and can communicate transactions over particular channels of communication to minimize the risk of security breaches. Additionally, each of these systems 114-118 can have corresponding data repositories 120-124 that store, among a variety of information for implementing these systems, user account information. For example, the debit or credit card information repository 122 can store information that identifies user credit card accounts, including the user's name, address, debit or credit card number, security code, EMV chip card information, social security number, balance information, transaction information, payment information, and/or other appropriate information. In another example, the financial account information repository 124 can store information that identifies user financial accounts, such as the user's name, account number, balance information, transaction history, payment history, user social security information, and/or other appropriate details.

The intermediary computer system 112a-c (e.g., YODLEE, CARDLINX) can be programmed to communicate with the systems 114-118 using the specific protocols and communication channels for these systems, which can ensure secure communication and authentication between the loyalty program computer system 102 and the computer systems 114-118. For example, to authenticate the credit card 110 with the system 116 (which allows the credit card account to be linked to the loyalty account for the user 106), the loyalty program computer system 102 can connect to the intermediary computer system 112b and request authorization code from the system 112b that can be embedded within an interface provided by the computer system 102 to the device 108 (e.g., embedded within an iframe of a website served by the computer system 102 to the device 108). Such embedded code can additionally establish a secure connection between the device 108 and the intermediary computer system 112b (e.g., establish secure socket layer (SSL)). The device 108 can provide identifying information regarding the credit card, such as a username and password that the user 106 had previously established with the credit card computer system 116. The intermediary computer system 112b can receive this information and transmit it to the credit card computer system 116 to authenticate the user 106 and his/her credit card 110 with the loyalty program computer system 102.

As part of the authentication process, the intermediary computer system 112b can provide the loyalty program computer system 102 and the credit card computer system 116 with information to indicate the user's 106 credit card account and loyalty account are authenticated (linked together). Such information can include, for example, tokens, codes, keys, and/or other uniquely identifying information that the systems 102 and 116 can use to verify the authentication. For example, the loyalty system 102 can store a unique identifier for the user's credit card account (e.g., credit card number, random unique identifier generated by the credit card computer system 116 and associated with the credit card account) and authentication information (e.g., authentication token) that can be provided to the credit card computer system 116 by the loyalty program computer system 102 (possibly via the intermediary computer system 112b). This information used for authentication can be stored in a secure manner by the loyalty program computer system 102 (e.g., using encryption).

In some implementations, the intermediary computer system 112b can store associations/mappings between cross-authenticated accounts, such as an information association repository 126b. For example, the intermediary computer system 112b and its repository 126b can store mappings and authentication information for the loyalty program computer system 102 and the credit card computer system 116 so that they can communicate with each other through the intermediary computer system 112b by simply transmitting their own account identifier. For instance, the loyalty program computer system 102 can transmit a loyalty account identifier for the user 106 to the intermediary computer system 112b, which can use the loyalty account identifier to retrieve a linked credit card computer account identifier and corresponding authentication information and communicate with the credit card computer system 116. The credit card computer system 116 can do the same by transmitting a credit card account identifier for the user 106 to the intermediary computer system 112b, which can retrieve the corresponding loyalty account identifier for the user 106 and authentication information. The repository 126b can use any of a variety of security mechanisms to ensure that mappings and other information are securely stored, such as data encryption techniques. The repository 126b can allow for each of the systems 102 and 116 to avoid having to store potentially sensitive information from other systems, which can improve security and reduce the chance of security breaches.

The loyalty program computer system 102 can perform similar authentication operations with other computer systems, such as the intermediary computer systems 112a and 112c, the merchant computer system 114, and the financial institution computer system 118. Similarly, the intermediary computer system 112a and 112c can be associated with information association repositories 126a and 126c, respectively, which can be used in a similar manner as the repository 126b.

Once authenticated, the system 100 can allow for loyalty programs provided by the computer system 102 to be securely used across a variety of linked accounts. For example, when the user 106 makes a purchase using the credit card 110 on a point of sale device 128 (e.g., payment terminal, cash register, mobile payment interface, online store interface), a corresponding merchant computer system 114 that processes the point of sale transaction can communicate and authorize the purchase with the credit card computer system 116. The credit card computer system 116 can determine, from the credit card that is charged for the transaction, that the credit card is linked to a loyalty program hosted by the loyalty program computer system 102. The credit card computer system 116 can communicate the purchase with the loyalty program computer system 102 (directly or via the intermediary computer system 112b), which can allocate a loyalty reward (e.g., points, money, miles) for the purchase to the loyalty account for the user 106. Depending on the type and settings for the loyalty account for the user 106, the loyalty program computer system 102 can distribute the rewards to the user through other accounts that are linked to the loyalty account, such as through financial accounts (e.g., bank accounts, loan accounts) managed by the financial institution computer system 118. For example, distribution of the reward can include depositing rewards into a financial account and/or applying payments to a financial account.

Through the system 100 and its security mechanisms, loyalty programs can be expanded to incorporate and link to a variety of different types of accounts, like accounts managed by the financial institution computer systems 118, and can allow for a variety of additional loyalty programs. For example, loyalty programs that provide education financing and/or student loan repayment rewards can be enabled by the example system 100. For example (education savings example), a loyalty program can be implemented by the system 100 in which users can link their loyalty accounts, which may be sponsored by retailers and/or by credit card providers, to education savings accounts (e.g., 529 college saving plans), which may be established for a beneficiary (e.g., family member, child) who is different from the owner of the loyalty account (e.g., parent, grand parent, family member). As users make qualifying purchases/transactions through their loyalty accounts, loyalty rewards can be accumulated and deposited into linked education savings accounts. At the same time, the linked education savings accounts can accrue interest on the deposited funds. Once the user and/or the beneficiary of the education savings account enrolls in a qualifying education program (e.g., accredited educational program, college, university, vocational training program), the funds that have been accumulated in the education savings account can be applied to tuition for the education program. Through this type of loyalty program, users can automatically save for education costs through an account that is likely to grow with time (e.g., 529 plan), which has the potential to benefit a large number of people.

In another example (student loan repayment example), a loyalty program can be implemented by the system 100 in which users can link loyalty accounts to student loan accounts (e.g., federal student loan accounts, private student loan accounts). As users make qualifying purchases/transactions through their loyalty accounts, loyalty rewards can be accumulated and applied to the outstanding balance of the linked student loan accounts. For example, the loyalty program can automatically apply a portion (e.g., 1-3%) of user purchases in association with their loyalty account to the balance in a linked student loan account. Through this loyalty program, users can automatically apply extra payments to their student loan balance, which can help users get out from under student loan debt, an issue affecting a large portion of the population.

In a further example (student loan refinancing example), a loyalty program can be implemented by the system 100 in which users can link their loyalty accounts to student loan accounts and can leverage/use their loyalty accounts to obtain refinancing of their student loan accounts. For example, accumulated loyalty rewards can be used to subsidize student loan refinancing so that student loans can be refinanced at lower interest rates. Such a loyalty program also has the potential to benefit a large number of consumers who are locked into student loans with high interest rates and who do not otherwise have the option to refinance at lower rates.

In another example (no-interest student loan example), a loyalty program can be implemented by the system 100 in which users can link loyalty accounts to both education savings accounts and, at a later date, to student loan accounts to obtain interest-free student loans. Through such a program, loyalty rewards can be accumulated and automatically deposited into an education savings account during a period of time before the user (or a beneficiary) begins incurring education expenses. Once the user (or beneficiary) enrolls in a qualifying education program, the accumulated money in the education savings account can be used to obtain an interest free student loan to fund the education program. The money in the education savings account can be used to pay the interest portion of the student loan, which can make the student loan interest free for the user repaying the loan. The amount of interest-free principal that a user may be able to take out under this program can depend on a variety of factors, such as an amount of money available in the education savings account, a repayment term for the student loan, and/or an expected duration for the education program (time until the user will begin repaying the loan). Interest may or may not accrue on the principal while the education program is underway. Such a program has the potential to benefit a large number of users who could obtain no-interest loans, which would make education repayment easier and less burdensome.

These example loyalty programs can be implemented by the computer system 100 separately, together, or in various combinations. For instance, a user may be able to elect to apply a portion of their loyalty rewards to the first example (education savings) and a remaining portion to the second example (loan repayment).

FIG. 1B depicts example information stored in the loyalty account information repository 104 and an example repository of automated distribution rules that can be used by the loyalty program computer system 102 to perform an example technique 172 to determine automatic distributions of rewards.

The depicted example information in the loyalty account information repository includes loyalty account mappings 132 and reward distribution allocations 140. The loyalty account mappings 132 include mappings between loyalty accounts and other accounts, such as credit and debit card accounts (e.g., accounts managed by the credit card computer system 116), financial institution accounts (e.g., loan accounts like student loan accounts and mortgage accounts, bank accounts, investment accounts, education savings accounts), merchant-specific loyalty accounts (e.g., re and/or other types of accounts. Each loyalty account can be mapped to one or more directions. For example, a loyalty account can be mapped to other accounts that can generate/earn loyalty rewards, such as credit or debit card accounts, merchant-specific accounts (e.g., airline mileage loyalty accounts, retailer loyalty accounts, hotel loyalty accounts). For instance, a loyalty account for a retailer (e.g., account that earns/generates rewards based on purchases at the retailer) can additionally be linked to a credit/debit card account that additionally generates/earns rewards for the loyalty account from purchases made using the linked credit/debit card.

Loyalty accounts can additionally/alternatively be mapped to one or more other accounts to which the earned rewards can be applied/redeemed. For example, loyalty accounts can be mapped to one or more loan accounts (e.g., student loan accounts, mortgage accounts) and/or to one or more investment/savings accounts (e.g., college savings/investment plan (529 plan), retirement account (401k, IRA), bank account, tax-deferred savings/investment plans). For instance, a loyalty account that accrues loyalty rewards can be linked a student loan account so that loyalty rewards that are earned/accrued for the loyalty account are redeemed/applied to the student loan account balance.

Account mappings can be made between different users. For example, parents and grandparents can link their loyalty accounts to student loan accounts or education savings plans (e.g., 529 plan) for their children and grandchildren. The loyalty program computer system 102 can be programmed to request authorization and/or consent from one or both parties when accounts are mapped between different users.

Account mappings can include one-to-one mappings 134 (one loyalty account to one other account), many-to-one mappings 136 (multiple loyalty accounts to one other account), one-to-many mappings 138 (one loyalty account to multiple other accounts), and many-to-many mappings (not depicted—multiple loyalty accounts to multiple other accounts). For example, a one-to-one mapping 134 can include a loyalty account being linked to a single credit card account through which rewards can be earned for the loyalty account, and being linked to a single student loan account through which earned rewards can be applied.

In another example, a many-to-one mapping 136 can include multiple loyalty accounts being linked to a single student loan account or education savings plan. For instance, loyalty accounts for multiple grandparents can be linked to a single student loan account for their grandchild so that loyalty rewards that are earned by the grandparents can be distributed to their grandchild's student loan account. In another example, multiple credit or debit card accounts for a user can be linked to the user's loyalty account.

In a further example, a one-to-many mapping 138 can include one loyalty account being linked to multiple accounts to which the earned rewards can be applied, such as student loan accounts and/or education saving plans. For instance, a user can link his/her loyalty account to his/her student loan account(s) and to an education savings plan for the user's child so that accrued rewards can be distributed to both the education savings plan and the student loan account (s). Similarly, a grandparent could link his/her loyalty account to multiple education savings plans for his/her grandchildren so that accrued rewards can be split among the education savings plans. In another example, one credit card account could be linked to multiple loyalty accounts so that rewards generated from transactions using the credit card can split among the multiple loyalty accounts.

In another example, a many-to-many mapping (not depicted) can include multiple loyalty accounts being linked to multiple other accounts, such as student loan accounts and/or education saving plans. For instance, a first grandparent can link his/her loyalty account to education saving accounts for his/her grandchildren A-D and a second grandparent can link his/her loyalty account to education savings accounts for his/her grandchildren C-F, where the first and second grandparents have the grandchildren C and D in common (e.g., first grandparent is from one side of family and second grandparent is from another side of family).

The reward distribution allocations information 140 includes information that has been designated (explicitly, implicitly, default setting not changed) by users as to how the loyalty rewards should be distributed. The reward distribution allocations information 140 includes allocation settings 142 that identify which accounts should receive reward distributions and in what amounts (e.g., percentages, fixed amounts). For example, a user with three accounts (e.g., student loan accounts, education saving accounts, mortgage accounts) can designate that 10% of the accrued rewards should be distributed to the first account, 40% should be distributed to the second account, and 50% should be distributed to the third account.

The reward distribution allocations information 140 also includes allocation thresholds 144 and contingent allocations 148 through which users can designate various thresholds and contingencies for the distribution of rewards. For instance, expanding upon the example from the previous paragraph, a user can designate a periodic threshold of $100 the first account so that once the $100 has been distributed to the first account within a time period (e.g., monthly, quarterly, annually, all time), the 10% that would be distributed to the first account is instead applied to the second and/or third accounts for the balance of the time period. In another example, a user can designate that once a threshold balance or threshold outstanding debt has been reached in a savings account or loan account, respectively, that a portion or all of the amount contributed to that account could shift to another account (e.g., account held by another user, different account held by the same user). The information/ settings 142-128 can persist until changed by the user and/or can be made to expire at various points in time (e.g., a first set of allocation settings/thresholds/contingencies is to be used for two years, after which a second set of allocations setting/thresholds/contingencies are to be used) and/or upon particular conditions being met (e.g., first set of allocation settings/thresholds/contingencies is to be used until person reaches age 18, after which a second set of allocations setting/thresholds/contingencies are to be used).

The repository of automated distribution rules 130 includes reward rate schedules 152 that include information correlating purchases, transactions, and other activities with specific loyalty rewards that are provided for one or more loyalty programs. For example, the reward rate schedule 152 can specify that purchases made with a particular retailer sponsoring a loyalty program are redeemed for rewards at a rate of 3%, purchases made elsewhere (other retailers) using the retailer's branded credit or debit cards are redeemed at a rate of 2%, and purchases made elsewhere using other credit or debit cards that are linked to the loyalty program are redeemed at a rate of 1%. The loyalty program computer system 102 can host and manage loyalty programs for multiple different loyalty programs, and can one or more reward rate schedules for each of the loyalty programs.

The purchase reward rates 150 can also include specific rates for particular types of goods/services 154 that purchased in association with the loyalty program, and can also include reward enhancement/reduction rules 156. For example, goods manufacturers and/or services providers may be willing to contribute portions of the purchase price as an added benefit for purchasing their goods/services, which they can do through the specific rates for particular types of goods/services 154. For instance, a cosmetics company may be willing to contribute 15% of the purchase price of its cosmetics product as a reward (in addition to or instead of the reward otherwise awarded through the rate schedule 152) and a clothing company may be willing to contribute 20% of the purchase price as a reward for purchasing its clothing products. Reward enhancements and/or reduction rules 156 can allow for specified actions by users, such as combinations of actions (e.g., purchasing at least a threshold number of products from a particular manufacturer), to increase or decrease reward levels above or below those specified by the rate schedule 152 and/or the good/service-specific rates 154. For example, the example cosmetics company mentioned above may be willing to enhance the rewards to 20% when a user purchases a threshold number and/or amount of their products over a period of time.

The repository of automated distribution rules 130 also includes distribution rules 158 that can be used by the loyalty program computer system 102 to determine how to automatically distribute rewards. For example, the distribution rules 158 include program-specific rules that can be used to determine reward distributions depending on a type of reward program in which users have enrolled. For example, education savings rules 160 (e.g., distribute rewards to education savings account until user/beneficiary has enrolled in qualifying education program, then distribute to education program) can be used to determine reward distributions when a user is enrolled in an education savings reward program. In another example, student loan savings rules 162 (e.g., distribute rewards to student loan account until balance reaches zero) can be used to determine reward distributions when a user is enrolled in a student loan savings reward program. In another example, student loan refinancing rules 164 (e.g., distribute rewards to student loan refinancing program) can be used to determine reward distributions when a user is enrolled in a student loan refinancing reward program. In another example, interest free student loan rules 166 (e.g., distribute rewards to education savings account until user/beneficiary has enrolled in qualifying education program, then distribute rewards to interest portion of student loan(s) for user) can be used to determine reward distributions when a user is enrolled in an interest free student loan reward program. Other reward programs are also possible, and reward programs can be designated/customized for particular loyalty programs that are hosted by the loyalty program computer system 102. A user may be able to enroll in multiple different loyalty programs, as indicated by the loyalty account information 104, and may use the reward distribution allocations 140 to designate distributions among the different programs.

The distribution rules 158 can also include account status rules 168 that are used to determine distributions based on account status (e.g., current vs. non-current on payments for accounts). For example, a user who has a first student loan that is current (payments are up to date) and a second student loan that is not current (user is behind on payments), the account status rules 168 can be used by the loyalty program computer system 102 to determine that loyalty rewards should be applied in their entirety to the non-current accounts until they become current, at which point regular/user-designated distributions of rewards can resume.

The distribution rules 158 can further include interest rate-based rules 170 that are used to automatically allocated rewards among different accounts that charge users interest. For example, the computer system 102 can use the rules 170 to determine that rewards should be applied in their entirety (or in a greater proportion) to a loan account having a high interest rate (greater than a threshold interest rate) so as to maximize the benefits of the rewards.

The loyalty program computer system 102 can be programmed to use the loyalty account information 104 and the automated distribution rules 130 to allocate and distribute rewards, for example, using the technique 172. For example, the loyalty program computer system 102 can receive transaction information that identifies transactions (174), and can use the loyalty account mappings 132 identify loyalty accounts that are mapped to the transactions (176). For example, the loyalty program computer system 102 can use identifying information provided for the transaction (e.g., credit or debit card number used for purchase, loyalty account number provided at point of sale) to identify one or more loyalty accounts that correspond to the transactions.

Using the transaction information and the identified loyalty accounts for the transactions, the loyalty program computer system 102 can determine reward distributions to the loyalty accounts based on the transactions (178). Such determinations can included determining reward amounts for the transactions (180), identifying recipient accounts to receive the distributions (182), and determining reward allocations among the recipient accounts (184). The reward amounts can be determined by the loyalty program computer system 102 using the purchase reward rates 150, as discussed above. The recipient accounts can be identified by the loyalty program computer system 102 using the loyalty account mappings 132 and/or the distribution rules 158, also discussed above. The reward allocations can be determined by the loyalty program computer system 102 using the reward distribution allocations 140 and/or the distribution rules 158, as mentioned above.

Once the recipient accounts have been identified and allocations have amongst them have been determined, the loyalty program computer system 102 can distribute the rewards (186).

Figure 2:
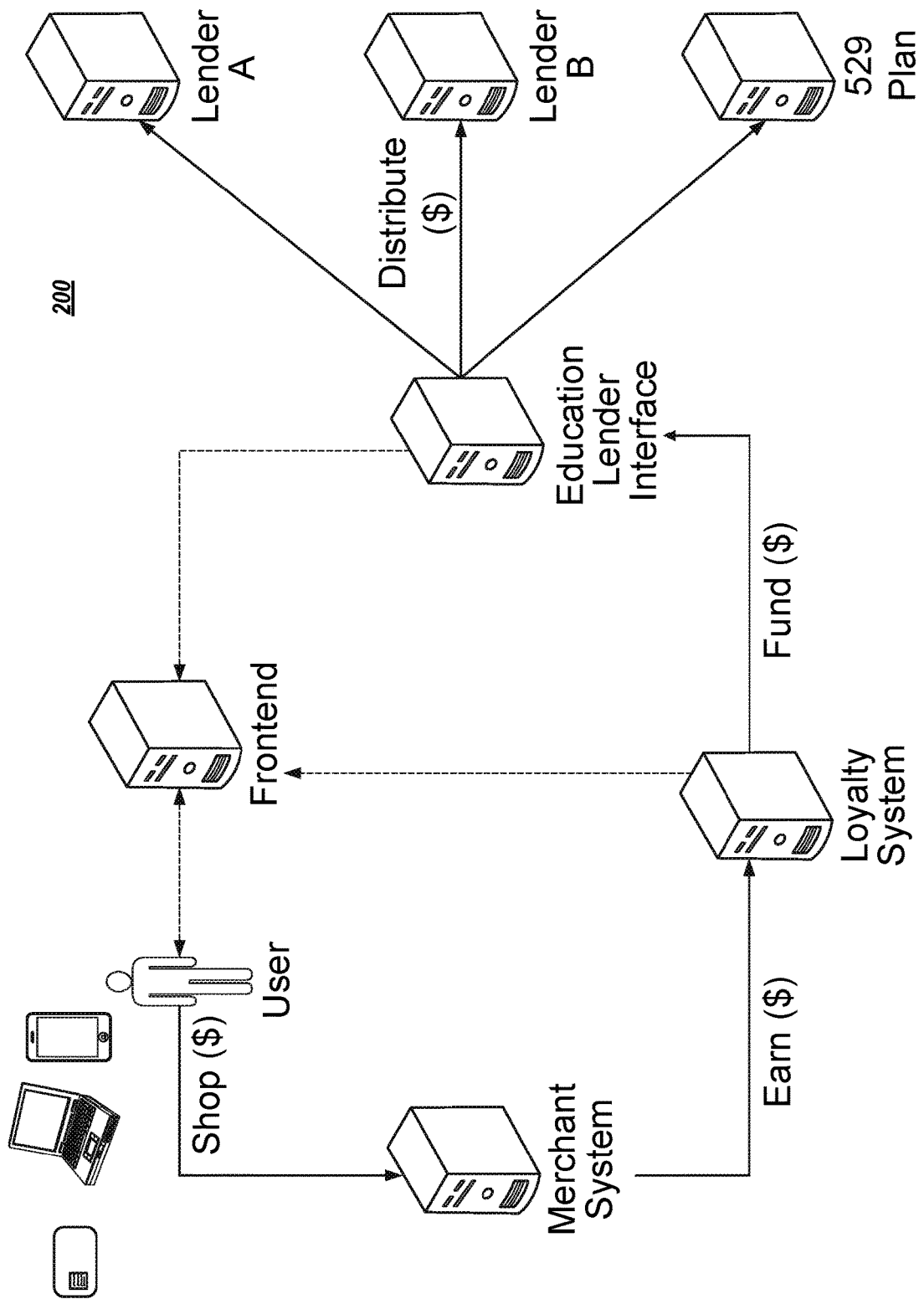
FIG. 2 depicts an example system that provides loyalty programs with education/student loan rewards.

FIG. 2 depicts an example system 200 that provides loyalty programs with education/student loan rewards. The example system 200 can be similar to the system 100, and can use some or all of the security features described to implement the education/student loan rewards. In this example, the solid lines indicate movement of money/resources/rewards as part of the loyalty program, and dashed lines indicate communication of information between entities.

In the example system 200, the user can register for the loyalty program with a frontend, for example, through any of a variety of computing devices (e.g., smartphone, laptop). The registration can include linking other accounts with the user's loyalty account, such as linking a credit card account, a student loan account, and/or an education savings account for the user with the loyalty account. Registration can also include the user selecting from among one or more of: the education savings example, the student loan repayment example, the student loan refinancing example, and the no-interest student loan example described above. Based on the user's selection, the loyalty system can manage and distribute accumulated loyalty rewards differently.

Loyalty rewards can be accrued by the user shopping with merchant systems. For example, the user can accrue rewards through in-store purchases and/or online purchases. A portion of the amount purchased (e.g., 1-3%) can be allocated by the merchant system to the loyalty system in association with the user's loyalty account. The loyalty system can report the accrued rewards to the frontend, which can provide these results (e.g., in real-time) to the user. The loyalty system can also distribute the accrued reward funds to an education lender interface, which can determine how to apply the funds for the user depending on the loyalty program selected by the user (education savings example, the student loan repayment example, the student loan refinancing example, and the no-interest student loan example). The education lender interface can distribute the funds to any of a variety of linked systems, including various lenders (lender a and lender b) and to education savings plans (e.g., 529 plan).

For example, if the user selected the education savings example, the education lender interface can distribute the funds to the 529 plan system. If the user selected the student loan repayment example, the education lender interface can distribute the funds to a lender corresponding to a student loan account that is linked to the user's loyalty account. If the user selected the student loan refinancing example, the funds can be distributed to a lender who is providing refinancing options to the user. And if the user selected the no-interest student loan example, the funds can be initially dispensed to the 529 plan and, once the user/beneficiary has enrolled in a corresponding education program, the funds can be distributed from the 529 plan to a lender corresponding to the user's student loan account.

Linking financial services products to loyalty programs can present a number of technical challenges, but the example system 200 can allow for such linkages to be established without users having to be issued specialized cards or relying on the use of portals and affiliate links to ensure appropriate connections and communication. By using the system 200, a user can proceed with using their financial services products in their normal/traditional manner and the appropriate linkages can be established to provide loyalty benefits, such as student loan repayment benefits and/or education savings plan benefits.

For example, the user in the system 200 can enter a store (physically and/or electronically (on mobile or on the web)) and can shop. While shopping in a store, the user can use his/her mobile device to scan the UPC of items in the store to determine the loyalty value that they will receive by purchasing the items (e.g., mobile device 108 can request and receive benefit information from loyalty program computer system 102 by transmitting item identifiers along with user identifier). While shopping through a web or mobile interface, the interface can display loyalty value information. Such loyalty value information can be determined, for example, using the example technique 172 in which the scanned/displayed items are run as hypothetical transactions and no funds are distributed. When the user has completed shopping, the user can follow a traditional checkout procedure by either proceeding to the physical checkout or following a traditional web/mobile checkout flow. The user is able to pay using his/her existing card and can receive loyalty benefits. In this situation, the user can do all of this (purchase and receive benefits) without needing to sign up for new or specialty card.

Continuing with this example, the loyalty benefit from the transactions can be initially calculated at a basket level asynchronously via a technical system that collects spend data through card-linked offer networks. For example, the credit card computer system 116 can be considered a card-linked offer network that provides spend data that is collected by the loyalty program computer system 102. It is also possible to include direct integrations with card schemes (e.g., VISA, MASTERCARD, DISCOVER, AMERICAN EXPRESS), but the benefit may still be calculated asynchronously. Benefit calculations can also be incorporated in real-time with point of sale systems (e.g., merchant computer system 114 using point of sale devices 128) so that loyalty benefits can be calculated and presented at the item (SKU) level to a user, for example, on a receipt (e.g., physical printout receipt, electronic receipt (email receipt, text message receipt)) and/or integrated with interfaces provided by mobile and/or web applications.

The system 200 can distribute loyalty benefits to designated account(s) in a variety of ways. For example, the system 200 can distribute benefits in batch at a preset day in a recurring period of time (e.g., same day each month, same day each quarter). In another example, the system 200 can distribute benefits in real-time as they are accrued. In a further example, the system 200 can distribute benefits once they are reached a threshold amount (e.g., distribute benefits once the accrued amount to distribute reaches $100).

As discussed above, loyalty benefits can be provided through the system 200 to not only a loyalty account holder, but also (or alternatively) to other people, such as friends and family. The loyalty benefits can be used, for example, to pay off a range of financial products, such as credit cards, mortgages, student loans, car loans, and other financial products.

Figure 3:
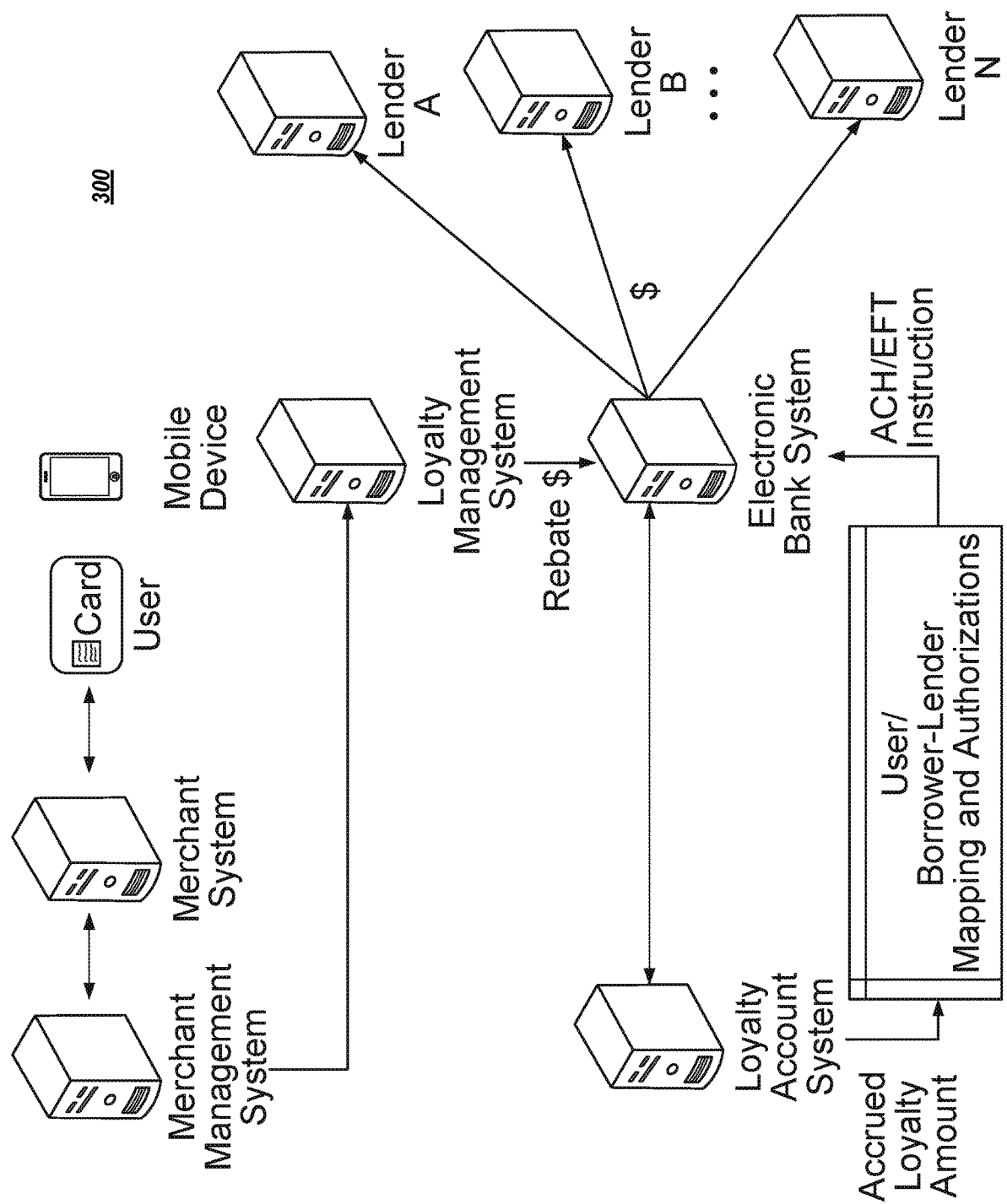
FIG. 3 depicts another example system that provides loyalty programs with education/student loan rewards.

FIG. 3 depicts another example system 300 that provides loyalty programs with education/student loan rewards. The example system 300 can be similar to the systems 100 and 200, and can use some or all of the security features described to implement the education/student loan rewards. This example picks up with the user, who is associated with the depicted credit card and mobile device, having already registered for a loyalty program and linked various other accounts (e.g., credit card, student loan, education savings plan) to the loyalty plan.

In this example, the user makes a purchase with a merchant system (e.g., in-store transaction, online purchase, mobile app purchase), which causes the merchant system (e.g., point of sale terminal, online store frontend) to communicate with a backend merchant management system to process the transaction. The merchant management system can identify that the purchase is associated with a loyalty account that is management by the loyalty management system, such as through identifying the credit card as being linked to the loyalty account and/or through identifying a loyalty account number being provided in association with the transaction. The merchant management system can relay information about the transaction to the loyalty management system, which can determine a corresponding rebate amount (e.g., 1-5% of the transaction amount).

The identified rebate amount can be transferred from the loyalty management system to an electronic bank system, which can query a loyalty account system that can determine what to do with the loyalty rebate. The loyalty account system can determine what to do with the accrued loyalty amount based on which of the loyalty programs was selected by the user (education savings example, the student loan repayment example, the student loan refinancing example, and the no-interest student loan example). Having identified what to do with the loyalty amount (e.g., deposit in education savings account, apply to student loan balance), the loyalty account system can reference data mapping users, borrowers, and/or lenders to each other through their linked accounts to determine which specific lender/bank/financial institution should receive the funds. Additionally, the data can include authorization information for making such transfers. Once the appropriate lender/bank/financial institution has been identified along with the corresponding authorization information, the loyalty account system can provide ACH/EFT instructions (ACH stands for automated clearing house and includes an electronic network of financial transactions including debit and credit transactions, such as direct deposit, payroll, vendor payments, and batch transactions; EFT stands for electronic funds transfer and includes transferring funds between accounts) to the electronic bank system, which can distribute the loyalty funds to an appropriate account with one of the example lenders A-N.

Figure 4:
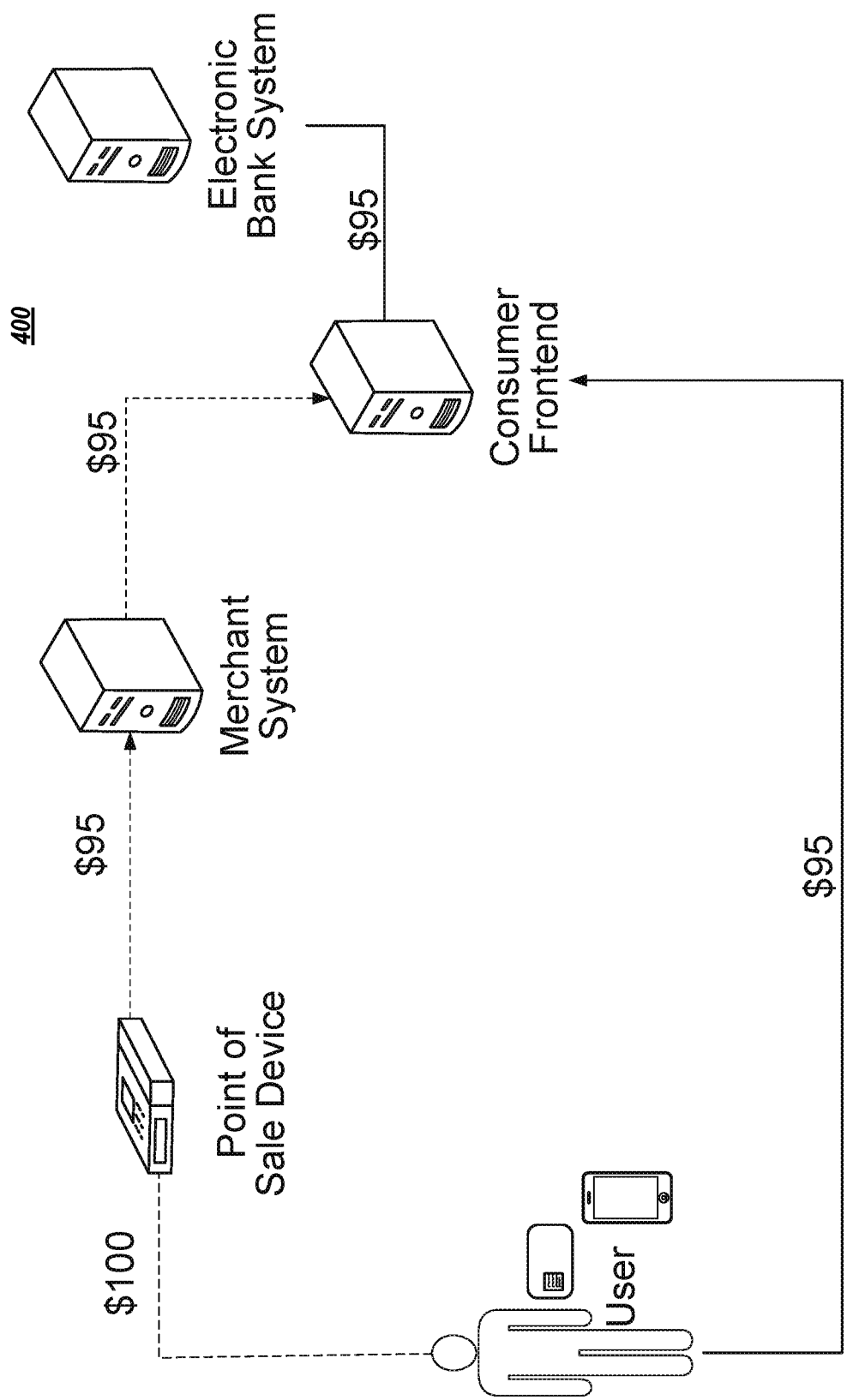
FIG. 4 depicts an example system that provides an example loyalty programs in which rewards are accrued at the point of sale device.

FIG. 4 depicts an example system 400 that provides an example loyalty programs in which rewards are accrued at the point of sale device. The example system 400 can be similar to the system 100. For example, in this example system 400 a user makes a purchase of $100 at the point of sale. The loyalty reward in this example is a 5% rebate on the purchase price, which is accrued at the point of sale—resulting in only the remaining 95% of the purchase being applied to the merchant system and billed to the user through the frontend. The user ends up only paying $95 (solid line) through the frontend, which is then transferred to an electronic bank system.

Figure 5:
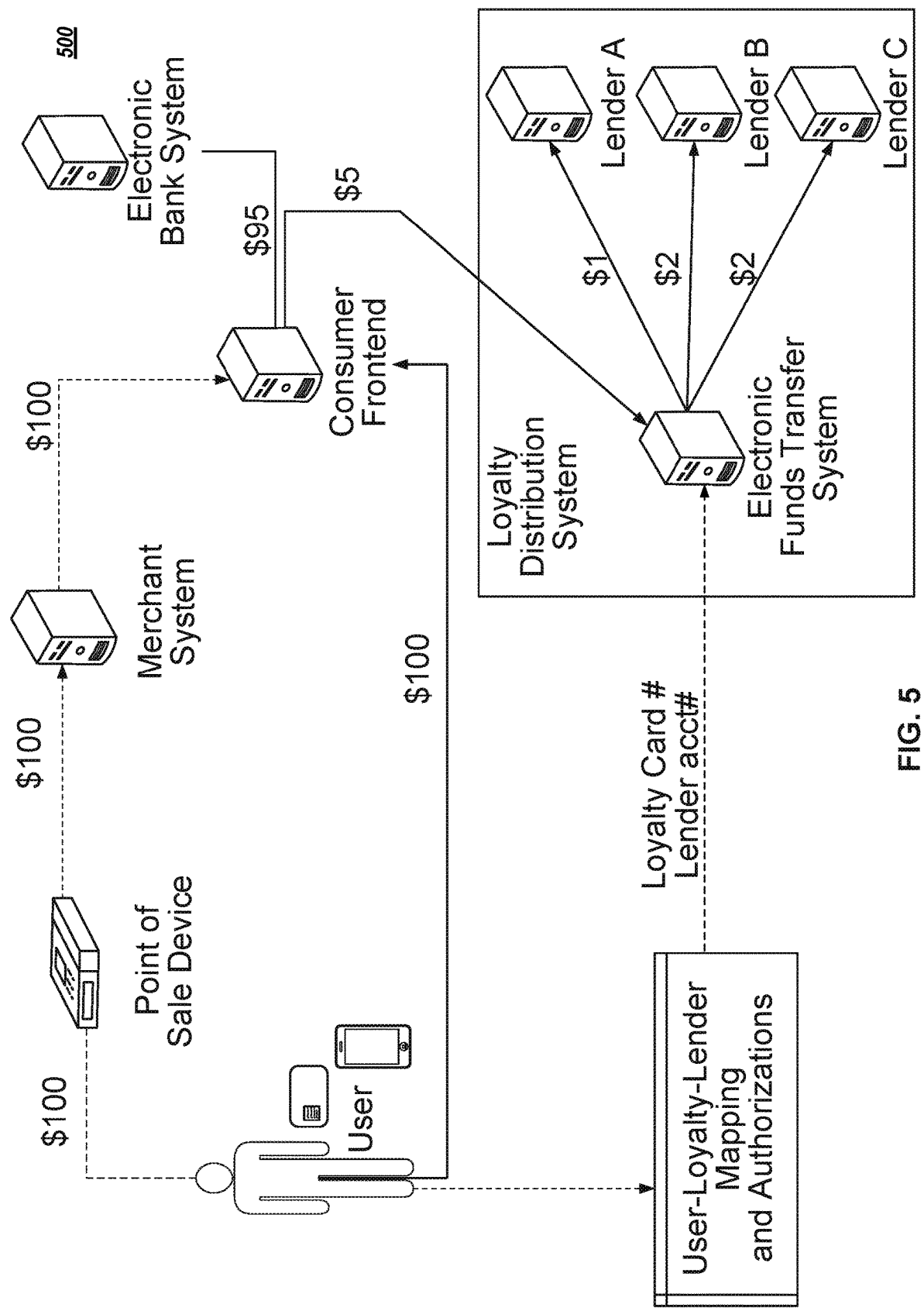
FIG. 5 depicts another example system that provides loyalty programs with education/student loan rewards.

FIG. 5 depicts another example system 500 that provides loyalty programs with education/student loan rewards. The example system 500 can be similar to the systems 100, 200, 300, and 400, and can use some or all of the security features described to implement the education/student loan rewards.

In contrast to the system 400 (which accrues rewards at the point of sale terminal), with the system 500 the loyalty rewards are accrued from consumer payments on purchases and are allocated based on user-loyalty-lender mappings and authorizations, which can be designated by a user. For example, in this example the user again makes a $100 purchase at a point of sale. However, in this example loyalty rewards are not accrued at the point of sale, so the full purchase amount ($100) is transferred to the merchant system for processing and onto the consumer frontend for billing/collection from the user. In this example, the user pays the full $100 purchase amount, which is then separated out into a loyalty award portion ($5) and a non-award portion ($95) that is transferred to an electronic bank system for the merchant. The loyalty award portion is transferred to a loyalty distribution system, that then distributes the award based on the mappings and authorizations that have been setup by the user. In this example, the user has designated that the funds be distributed in various amounts (e.g., percentages) to lenders A, B, and C which have accounts (e.g., student loan accounts, education savings accounts) for the user. These accounts can be linked to the loyalty account for the user through the mappings and authorizations, as discussed above with regard to FIG. 1A.

Figure 6:
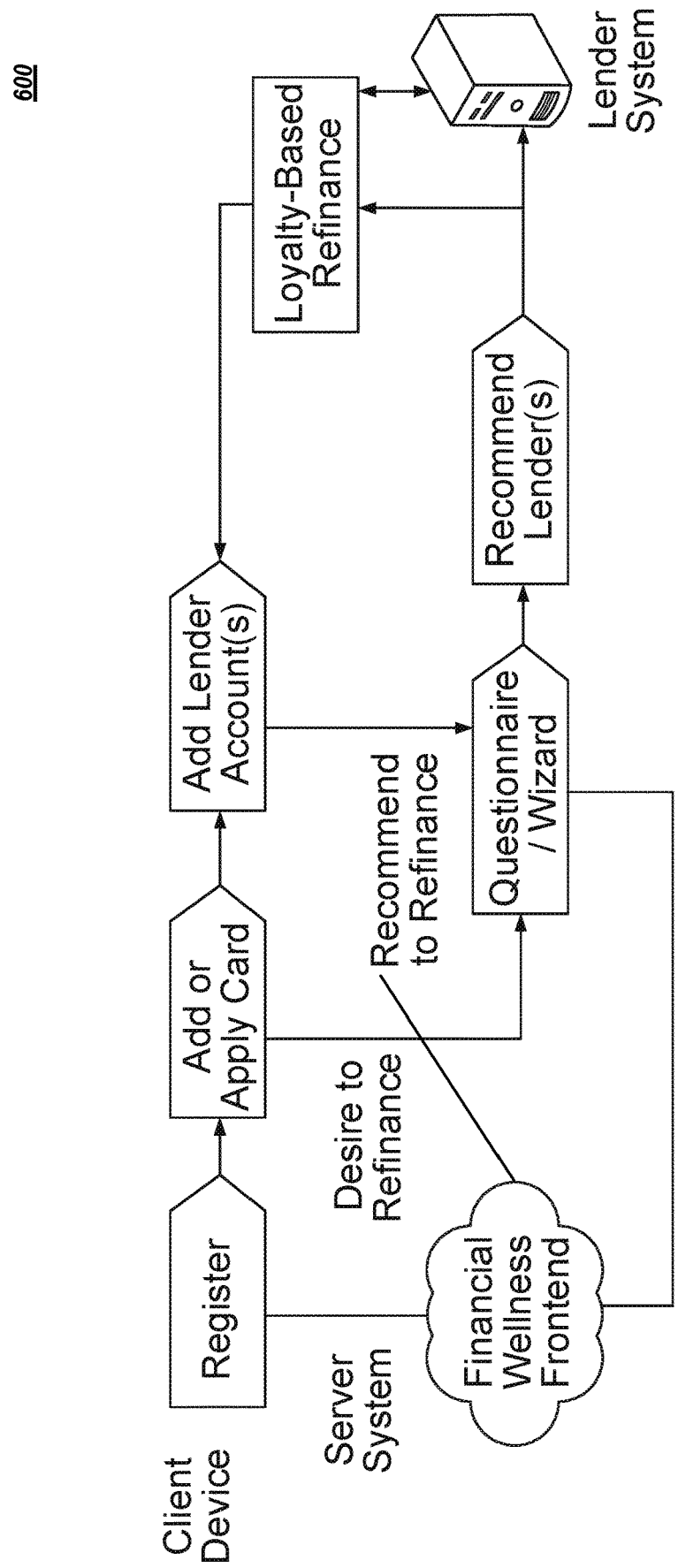
FIG. 6 depicts another example system that provides loyalty programs with education/student loan rewards.

FIG. 6 depicts another example system 600 that provides loyalty programs with education/student loan rewards. The example system 600 can be similar to the systems 100, 200, 300, 400, and 500, and can use some or all of the security features described to implement the education/student loan rewards.

The example system 600 outlines an example process for loyalty-based student loan refinancing. In this example, a user (acting through a client device) can register with a financial wellness frontend provided by a server system. As part of the registration the user can link one or more cards (e.g., credit cards) and/or lender accounts to the user's loyalty account. The wellness frontend can present a questionnaire/wizard that can pose a number of questions/scenarios to the user, and through which an interest in refinancing the student loan (lender account) can either be identified by the user or recommended by the server system. The server system can recommend one or more lenders for the refinancing and, through interactions with the one or more lenders, the client device can perform a loyalty-based refinance of the user's student loans.

Figure 7:
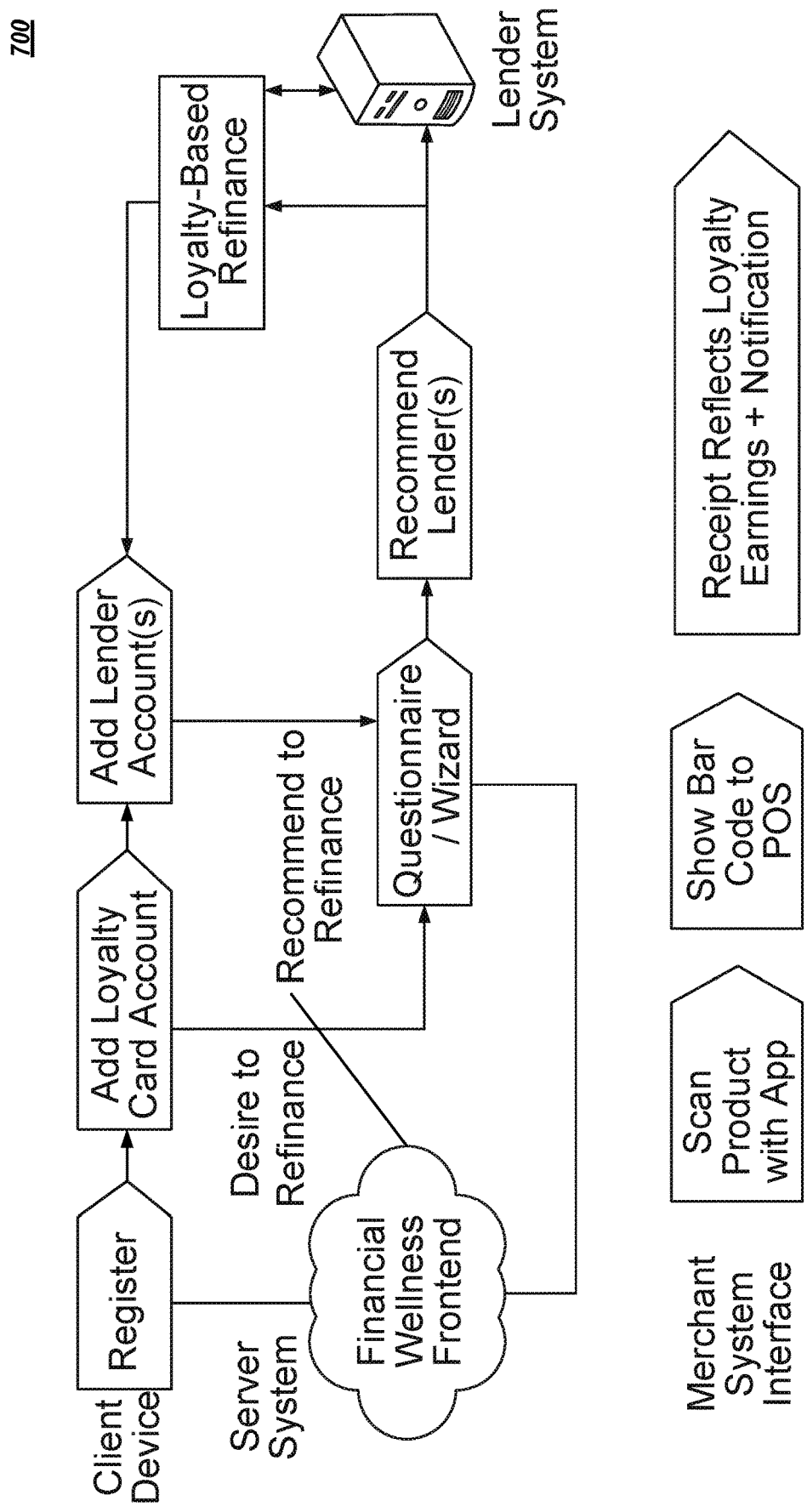
FIG. 7 depicts another example system that provides loyalty programs with education/student loan rewards.

FIG. 7 depicts another example system 700 that provides loyalty programs with education/student loan rewards. The example system 600 can be similar to the systems 100, 200, 300, 400, 500, and 600, and can use some or all of the security features described to implement the education/student loan rewards.

The example system 700 includes loyalty-based refinancing (same as in FIG. 6) concurrently with loyalty earnings being accrued through merchant system interface that allow the client device to scan products with a mobile app to accrue loyalty earnings, to accrue loyalty earnings through providing a bar code for products at a point of sale terminal, and then allows users to view loyalty earnings and to receive notifications (e.g., in real-time) regarding loyalty earnings.

Figure 8:
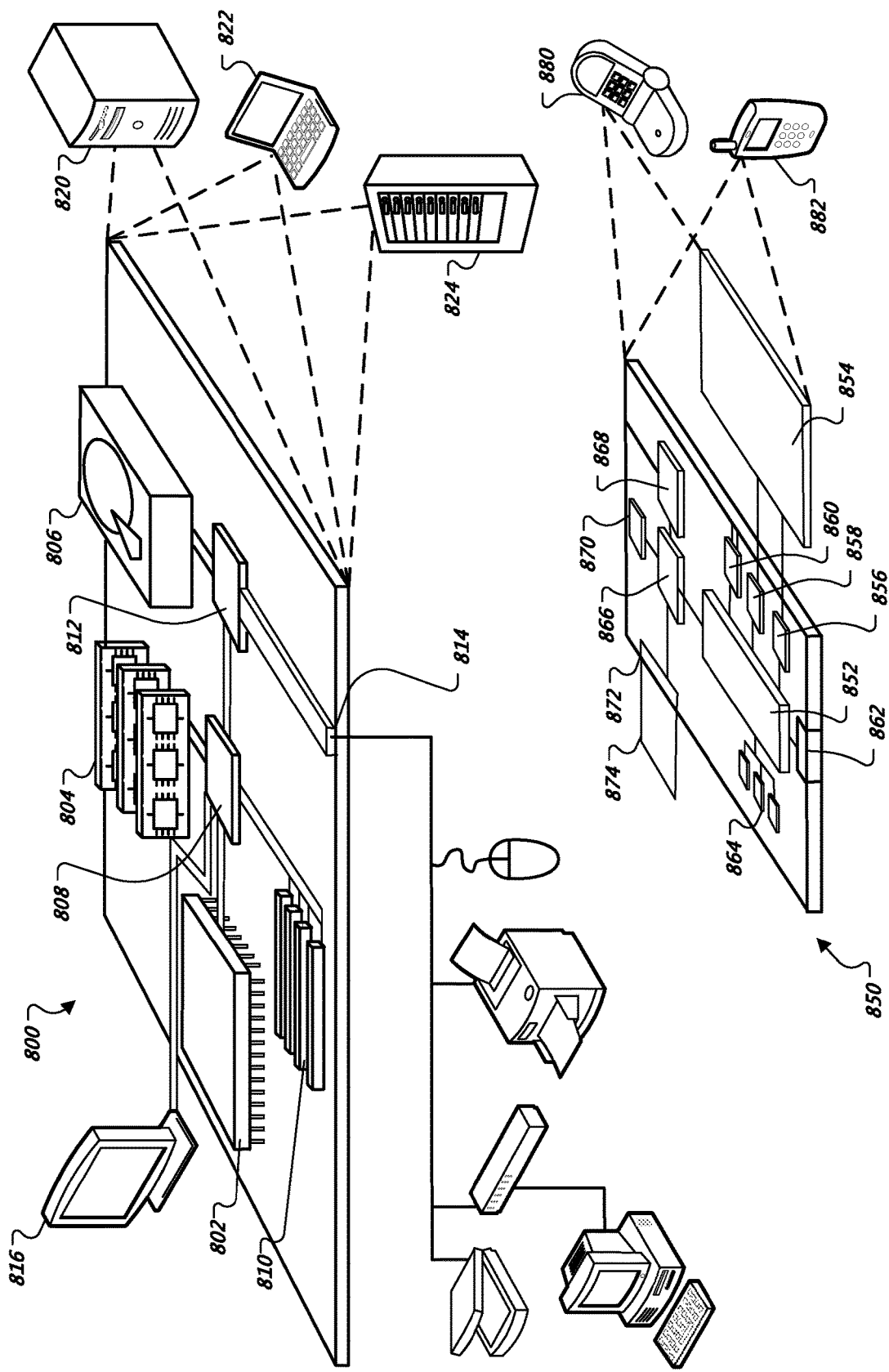
FIG. 8 is a block diagram of example computing devices.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 810 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A system with a decentralized architecture to provide secure loyalty program, the system comprising:

a plurality of separate database systems to disperse storage of data for the secure loyalty program across a plurality of separate file systems with different authentication and encryption schemes, the data comprising (i) loyalty account data for loyalty accounts, (ii) first association data that links credit card accounts to the loyalty accounts, and (iii) second association data that links the loyalty accounts to financial accounts, wherein the plurality of separate database systems include (i) a loyalty account database system to store the loyalty account data, (ii) a first intermediary database system to store the first association data, and (iii) a second intermediary database system to store the second association data;

a loyalty program computer system to securely receive credit card transaction data and allocate loyalty rewards, the loyalty program computer system including (i) a secure communication interface to use one or more encryption schemes for secure communication, (ii) the loyalty account database system, and (iii) an automated loyalty reward distribution rules to automatically allocate the loyalty rewards to the financial accounts based on the credit card transaction data, wherein the loyalty program computer system is programmed to allocate the loyalty rewards;

a first intermediary computer system to securely manage and provide access to the first intermediary database system by (i) authenticating access requests, and (ii) encrypting the first association data in the first intermediary database system using a first encryption scheme; and a second intermediary computer system to securely manage and provide access to the second intermediary database system by (i) authenticating access requests, and (ii) encrypting the second association data in the second intermediary database system using a second encryption scheme, wherein the loyalty program computer system is configured to perform operations comprising:

communicating with a credit card system through a first secure communication channel provided by the first intermediary computer system between the loyalty program computer system and the credit card system, wherein the first intermediary computer system establishes secure data communications and is configured to authenticate user credit card accounts and loyalty accounts;

receiving, through the first secure intermediary computer system, credit card account identifiers from the credit card system over the first secure communication channel;

transmitting loyalty account identifiers to the first secure intermediary computer system, wherein the first secure intermediary computer system stores the encrypted first association data and is configured to receive the credit card account identifiers through the first secure communication channel from the credit card system and identify the loyalty account identifiers that match the credit card account identifiers using the encrypted first association data;

receiving, from the first secure intermediary computer system, the identified loyalty account identifiers over the first secure communication channel;

identifying loyalty rewards data associated with the identified loyalty account identifiers based on the credit card transaction data provided by the credit card system;

communicating with a financial institution computer system through a second secure communication channel provided by the second intermediary computer system between the loyalty program computer system and the financial institution computer system;

receiving, through the second secure intermediary computer system, financial account identifiers from the financial institution computer system over the second secure communication channel;

transmitting, to the second secure intermediary computer system, the identified loyalty rewards data with the identified loyalty account identifiers over the second secure communication channel, wherein the second secure intermediary computer system stores the encrypted second association data and is configured to receive the identified loyalty account identifiers through the second secure communication channel and identify the financial account identifiers that match the identified loyalty account identifiers using the encrypted second association data; and distributing loyalty rewards to financial accounts by transmitting, through the second secure intermediary computer system, the identified loyalty rewards data with the identified financial account identifiers to the financial institution computer system over the second secure communication channel, wherein the financial accounts are identified by the identified financial account identifiers, and loyalty rewards are distributed to the identified financial accounts, wherein the financial accounts include student loan accounts that are administered by the financial institution computer system.

2. The system of claim 1, wherein:
the first intermediary computer system authenticates the access requests from both the credit card system and the loyalty program computer system using first cross-authentication information that authenticates the links between the credit card accounts to the loyalty accounts; and
the second intermediary computer system authenticates the access requests from both the loyalty program computer system and the financial institution computer system using second cross-authentication information that authenticates the links between the loyalty accounts and the financial accounts.

3. The system of claim 2, wherein the first cross-authentication information and the second cross-authentication information each includes one or more of: authentication tokens, authentication codes, and authentication keys.

4. The system of claim 1, wherein the automated loyalty reward distribution rules include (i) reward rules that define the loyalty rewards that are awarded for particular types of credit card activity and (ii) distribution rules that define the particular types of financial accounts to which the loyalty rewards are allocated.

5. The system of claim 1, wherein the automated loyalty reward distribution rules include (i) one-to-one mappings between a single loyalty account and a single financial account, (ii) many-to-one mappings between a plurality of loyalty accounts and a single financial account, and (iii) one-to-many mappings between a single loyalty account and a plurality of financial accounts.

6. The system of claim 5, wherein:
the one-to-one mappings cause loyalty rewards accrued for a single loyalty account to be allocated to a corresponding single financial account;
the many-to-one mappings cause loyalty rewards accrued for a plurality of loyalty accounts to be allocated to a single financial account; and
the one-to-many mappings cause loyalty rewards accrued for a single loyalty account to be allocated among a plurality of financial accounts.

7. The system of claim 1, wherein the financial accounts include education savings accounts.

8. The system of claim 4, wherein the reward rules include (i) a reward rate schedule that designates default loyalty rewards that are allocated to the financial accounts based on the credit card transaction data and (ii) specific goods and services reward rate schedules that designate specific loyalty rewards that are allocated to the financial accounts based on the credit card transaction data related to specific goods or services.

9. The system of claim 8, wherein the reward rules further include reward enhancement rules that designate additional loyalty rewards that are allocated to the financial accounts based on credit card transaction data meeting one or more threshold values.

10. The system of claim 6, wherein the automated loyalty reward distribution rules include allocation settings that correspond to the one-to-many allocation mappings, the allocation settings including specific allocation designations for the plurality of financial accounts from the single loyalty account.

11. The system of claim 10, wherein the specific allocation designations include percentage allocations from the single loyalty account to each of the plurality of financial accounts.

12. The system of claim 10, wherein the specific allocation designations include fixed amounts allocated from the single loyalty account to one or more of the plurality of financial accounts.

13. The system of claim 10, wherein the specific allocation designations include allocation thresholds from the single loyalty account to one or more of the plurality of financial accounts.

14. The system of claim 13, wherein the allocation thresholds correspond to amounts contributed to the one or more of the plurality of financial accounts over a period of time.

15. The system of claim 13, wherein the allocation thresholds correspond to current balances in the plurality of financial accounts.

16. The system of claim 10, wherein the specific allocation designations includes contingent allocations from the single loyalty account to one or more of the plurality of financial accounts.

17. The system of claim 16, wherein the contingent allocations include one or more conditions that, when satisfied, cause allocations from the single loyalty account otherwise slated for distributed to the one or more of the plurality of financial accounts to be instead allocated to others of the plurality of financial accounts.

18. The system of claim 17, wherein the one or more conditions are based on current balances in the plurality of financial accounts.

* * * * *